s009141824B2

(12) United States Patent
Olumofin

(10) Patent No.: US 9,141,824 B2
(45) Date of Patent: Sep. 22, 2015

(54) DYNAMIC DATABASE UPDATE IN MULTI-SERVER PRIVATE INFORMATION RETRIEVAL SCHEME

(71) Applicant: Pitney Bowes Inc., Stamford, CT (US)

(72) Inventor: Femi Olumofin, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 14/265,667

(22) Filed: Apr. 30, 2014

(65) Prior Publication Data

US 2014/0344944 A1    Nov. 20, 2014

Related U.S. Application Data

(60) Provisional application No. 61/817,463, filed on Apr. 30, 2013.

(51) Int. Cl.
*G06F 21/62* (2013.01)
*G06F 17/30* (2006.01)
*H04L 9/32* (2006.01)
*H04L 9/00* (2006.01)

(52) U.S. Cl.
CPC ........ *G06F 21/6227* (2013.01); *G06F 21/6218* (2013.01); *H04L 9/008* (2013.01); *H04L 9/3297* (2013.01)

(58) Field of Classification Search
None
See application file for complete search history.

(56) References Cited

U.S. PATENT DOCUMENTS 5,671,407 A * 9/1997 Demers et al. ................... 1/1
2005/0259817 A1 * 11/2005 Ramzan et al. ............. 380/46
2007/0081664 A1 * 4/2007 Avidan et al. ............... 380/28
2009/0190751 A1 * 7/2009 Ramzan et al. ............. 380/28
2013/0246791 A1 * 9/2013 Di Crescenzo ............ 713/168

OTHER PUBLICATIONS

Blundo, C., D'Arco, P., De Santis, A., Stinson, D.R.: On unconditionally secure distributed oblivious transfer. Journal of Cryptology 20(3), 323-373 (2007).*
X. Lai, J. Zhou, and H. Li (Eds.) Round-Efficient Oblivious Database Manipulation. ISC 2011, LNCS 7001, pp. 262-277, 2011. Springer-Verlag Berlin Heidelberg 2011.*
S. Jarecki and G. Tsudik (Eds.) Controlling Access to an Oblivious Database Using Stateful Anonymous Credentials. PKC 2009, LNCS 5443, pp. 501-520, 2009. International Association for Cryptologic Research 2009.*
Y. Huang and I. Goldberg. Outsourced private information retrieval with pricing and access control. Technical Report Nov. 2013, Centre for Applied Cryptographic Research (CACR), University of Waterloo, Feb. 2013.*

(Continued)

*Primary Examiner* — Michael R Vaughan
(74) *Attorney, Agent, or Firm* — Brian A. Lemm; Charles R. Malandra, Jr.; Steven J. Shapiro

(57) ABSTRACT

A system and methods to provide updates of an oblivious database that is based on an original database without compromising privacy guarantees, and without requiring a periodic downtime to re-initialize the database. According to embodiments of the present invention, update caches are provided at the random servers that are not emptied or sent to the oblivious database after every update in a predictable fashion. Instead, updates are made incrementally to the oblivious database in an order that is independent of how the original database is updated. Hence there is no way for the server to learn which record of the oblivious database corresponds to an updated block from the original database.

2 Claims, 4 Drawing Sheets

(56) References Cited

OTHER PUBLICATIONS

B. Chor, O. Goldreich, E. Kushilevitz, and M. Sudan. Private Information Retrieval. Journal of the ACM, vol. 45, No. 6, Nov. 1998, pp. 965-982.*
P. Williams, R. Sion, and A. Tomescu. Privatefs: A parallel oblivious _le system. In CCS, 2012.*
Dmitri Asonov and Johann-Christoph Freytag. Repudiative Information Retrieval. In WPES'02. pp. 32-40, 2002.
Amos Beimel. Yuval Ishai, Tal Malkin. Reducing the Servers' Computation in Private Information Retrieval: PIR with Preprocessing. J. Cryptol. 17(2): 125-151, 2004.
Amos Beimel, Yoav Stahl. Robhurst Information—Theoretic Private Information Retrieval. In SCN'02. pp. 326-341. 2003.
B. Chor. O. Goldreich, E. Kushilevitz, and M. Sudan, Private Information Retrieval. In FOCS'95 Proceedings of the 36th Annual Symposium on the Foundations of Computer Science, pp. 41-50, Oct. 1995.
Casey Devet, Ian Goldberg, and Nadia Heninger, Optimally Robust Private Information Retrieval. In Proceedings of the 21st USENIX conference on Security Composium, Security'12. pp. 13-13, Berkeley, CA, USA, 2012. USENIX Association.
Yael Gertner, Shafi Goldwasser, Tal Malkin. A Random Server Model for Private Information Retrieval or How to Achieve Information Theoretic PIR Avoiding Database Replication. In RANDOM'96, pp. 200-217. 1998.
Ian Goldberg, Improving the Robustness of Private Information Retrieval. In Proceedings of the IEEE Symposium on Security and Privacy. pp. 131-148, 2007.
E. Kushilevitz. and R. Ostrovsky. Replication is Not Needed. Single Database. Computationally-Private Information Retrieval. In FOCS'97, pp. 364. 1997.
Femi Olumofin and Ian Goldberg. Preserving Access Privacy Over Large Databases. Technical report CACR 2010-33, University of Waterloo. 2010. http:/www.cacr.math.uwaterloo.co/techreports/2010/cacr2010-33.pdf.
Femi Olumofin and Ian Goldberg. Revisiting the Computational Practicality of Private Information Retrieval. In Financial Cryptography and Data Security'11. St. Lucia. 2011.
Radu Sion and Bogdan Carbunar. On the Computational Practicality of Private Information Retrievel. In NDSS'07, 2007.

* cited by examiner

DYNAMIC DATABASE UPDATE IN MULTI-SERVER PRIVATE INFORMATION RETRIEVAL SCHEME

CROSS REFERENCE TO RELATED APPLICATIONS

This application claims the benefit of U.S. Provisional Application Ser. No. 61/817,463, filed Apr. 30, 2013, the specification of which is hereby incorporated by reference.

FIELD OF THE INVENTION

The present invention relates to multi-server private information retrieval schemes, and in particular to enabling database updates to occur concurrently with user queries, without allowing the update process to compromise the privacy of user queries and the database content.

BACKGROUND OF THE INVENTION

A critical privacy protection that users crave is preventing information they consider sensitive from being inadvertently leaked as they query or access Internet services. In other words, users see the problem of preserving their access privacy to online services as an important concern that must be addressed. A cryptographically sound approach to protect access privacy it to use the technique of private information retrieval (PIR). PIR schemes, as are known in the art, allow a user to access data from service providers without the service providers being able to learn any information about which particular data item was accessed or retrieved.

One such PIR scheme requires a database to be replicated to two or more servers that are assumed not to be colluding. A query received from a user is separated into different parts, and each part is sent to a different server. The returned result from each server, based on the portion of the query each received, is returned back to the client where the results are combined to provide a complete response to the full query. However, concerns remain about the practicality of having an organization replicate its database to the servers of multiple different cloud services that are assumed not to collude. Replicating a database to multiple independent cloud servers increases the chances of the data being broken into, used without consent, or used for illegitimate purposes. In short, it is inconceivable that an organization would ever want to give out a copy of its database especially as it may represent their intellectual property, trade secret, or asset.

To address the database replication problem, a random server model of PIR was introduced by Gertner et al. (Yael Gertner, Shafi Goldwasser, and Tal Malkin. A Random Server Model for Private Information Retrieval or how to Achieve Information Theoretic PIR Avoiding Database Replication. In *RANDOM* '98, pages 200-217, 1998). This model attempts to separate the task of providing query privacy from that of information retrieval using auxiliary random servers running databases containing random data. The database server uses the service of two or more random servers to generate an encrypted and permuted version of its database and to help keep the user queries private. Of particular interest in this solution are universal random servers, which are a type of auxiliary servers holding random data that is completely independent of the content of the database. Gertner et al. proposed a scheme that achieves total independence, i.e., all random servers are of the universal type—they contain no information derived from content of the dataset, thereby addressing the database replication problem. In other words, the scheme provides user privacy according to the underlying PIR scheme used with the scheme, and database privacy (no single server or a coalition can learn any information about the content of the database).

Gertner et al.'s secure multi-party computation (SMC) protocol enables the server holding a database x and two auxiliary random servers each holding a random database $\alpha$ and a pseudorandom permutator $\pi$, to compute an initial oblivious database $y=\pi(x \oplus \alpha)$. However, their protocol must be rerun to re-compute y after a large (e.g., sublinear) number of queries have been run or whenever the database x is updated. But, naively updating the oblivious database y with updates from x leaks information about $\pi$. In other words, an update to some record $x_i$ would require an update to be made to some oblivious database block $y_j$ and the server maintaining the database is able to learn that $j=\pi^{-1}(i)$. Hence, finding a periodic downtime to rerun the SMC is prescribed to update the oblivious database y. As a result, users would have to suspend making query requests during the SMC protocol rerun because the random servers would be preoccupied. Such a wait is undesirable in environments where database changes are frequent and query downtimes are unacceptable. The second problem with this scheme is that it expects the same random database to be used to mask multiple databases belonging to different organizations, which can lead to significant attacks in practice (i.e., the attacker learns r by running several queries across databases and uses this knowledge to learn the blocks of a target y much faster).

SUMMARY OF THE INVENTION

The present invention alleviates the problems described above by providing a system and methods to provide updates of the database x without compromising privacy guarantees, and without requiring a periodic downtime to re-initialize the database. According to embodiments of the present invention, update caches are provided at the random servers that are not emptied or sent to the oblivious database y after every update in a predictable fashion. Instead, updates are made incrementally to the oblivious database in an order that is independent of how the database x is updated. Hence there is no way for the server to learn which record $y_j$ corresponds to an undated block $x_i$. Utilizing the present invention makes a multi-server PIR deployment more feasible in an environment where the database changes frequently.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
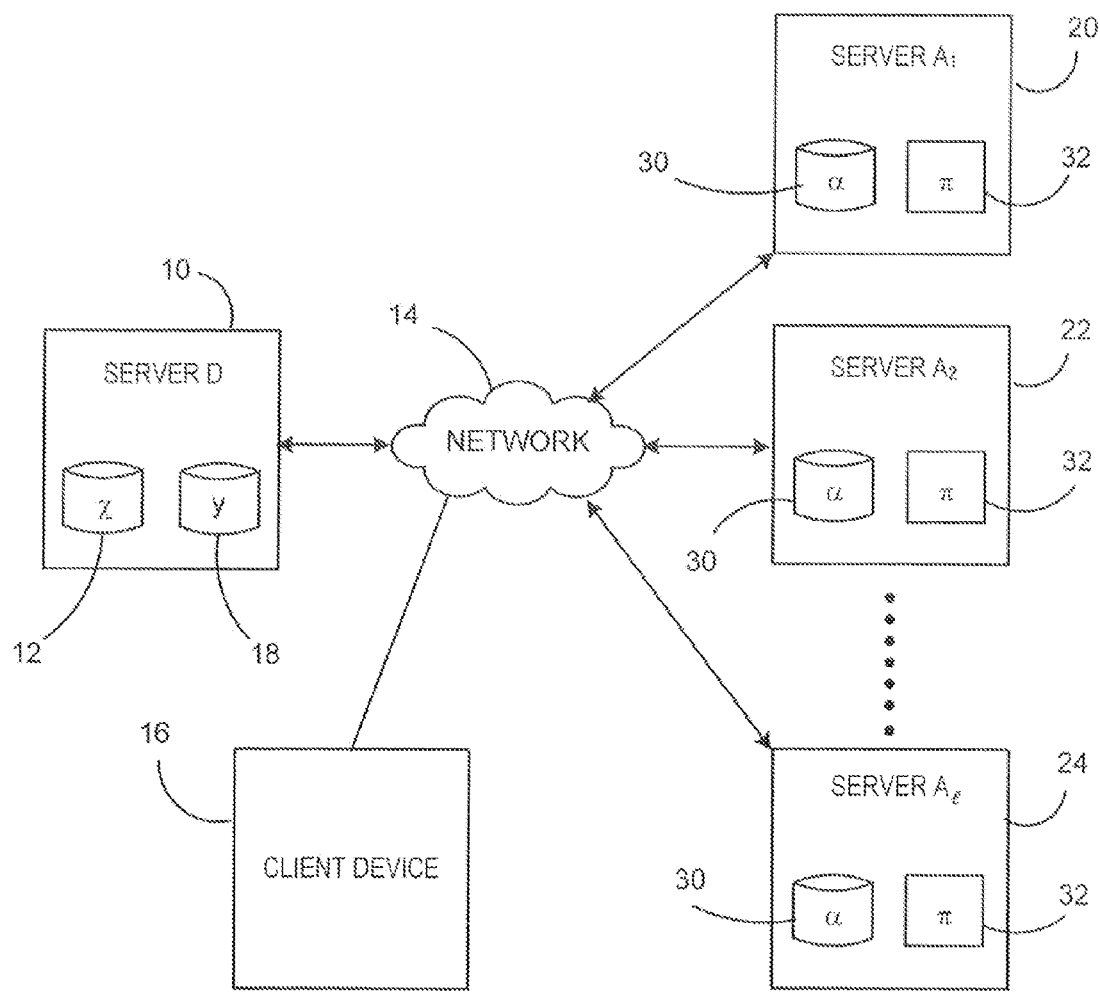
FIG. 1 is a block diagram of a system that allows database updates to occur concurrently with query processing, without leaking any information about the correspondence between an updated record in the database and the respective oblivious database blocks according to embodiments of the present invention.

In describing the present invention, reference is made to the drawings, wherein there is seen in FIG. 1 in block diagram form a portion of a system that allows database updates to occur concurrently with query processing, without leaking any information about the correspondence between an updated record in the database and the respective oblivious database blocks according to embodiments of the present invention. A Server D 10 holds the original database x 12 consisting of r records or blocks each of b bits in length and an oblivious database y 18 that is based on the original database 12 (as described further below). Alternatively, the database y could be held by another server if desired. A plurality of l universal auxiliary random servers Server $A_1$ 20, Server $A_2$ 22, ... Server $A_l$ 24 each hold a random database $\alpha$ 30, and a pseudorandom permutator processing device $\pi$ 32, where $\pi:[1 \ldots r] \to [1 \ldots r]$. A user can perform a query to retrieve data stored in the oblivious database 18 (and hence obtain information from the original database 12) using a client device 16, which may be, for example, any type of computing device such as a personal computer, smartphone, tablet, etc. that can access the network 14 and request a search. Because the data is obtained from the oblivious database 18, the server 10 (or other server that performs the search) does not know what content was actually returned to the client device 16, thereby maintaining the privacy of the user query. Each of the servers may be operated, for example, by a cloud service provider. Each of the servers is coupled to a network 14, such as, for example the Internet. The servers 10-24 may be a mainframe or the like that includes at least one processing device (not shown). Servers 10-24 may be specially constructed for the required purposes, or may comprise a general purpose computer selectively activated or reconfigured by a computer program (described further below) stored therein. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by the processing device. One of ordinary skill in the art would be familiar with the general components of a computing system upon which the method of the present invention may be performed. Each of the servers 10-24 is adapted to communicate with other devices via the network 14 as is known in the art.

Figure 2:
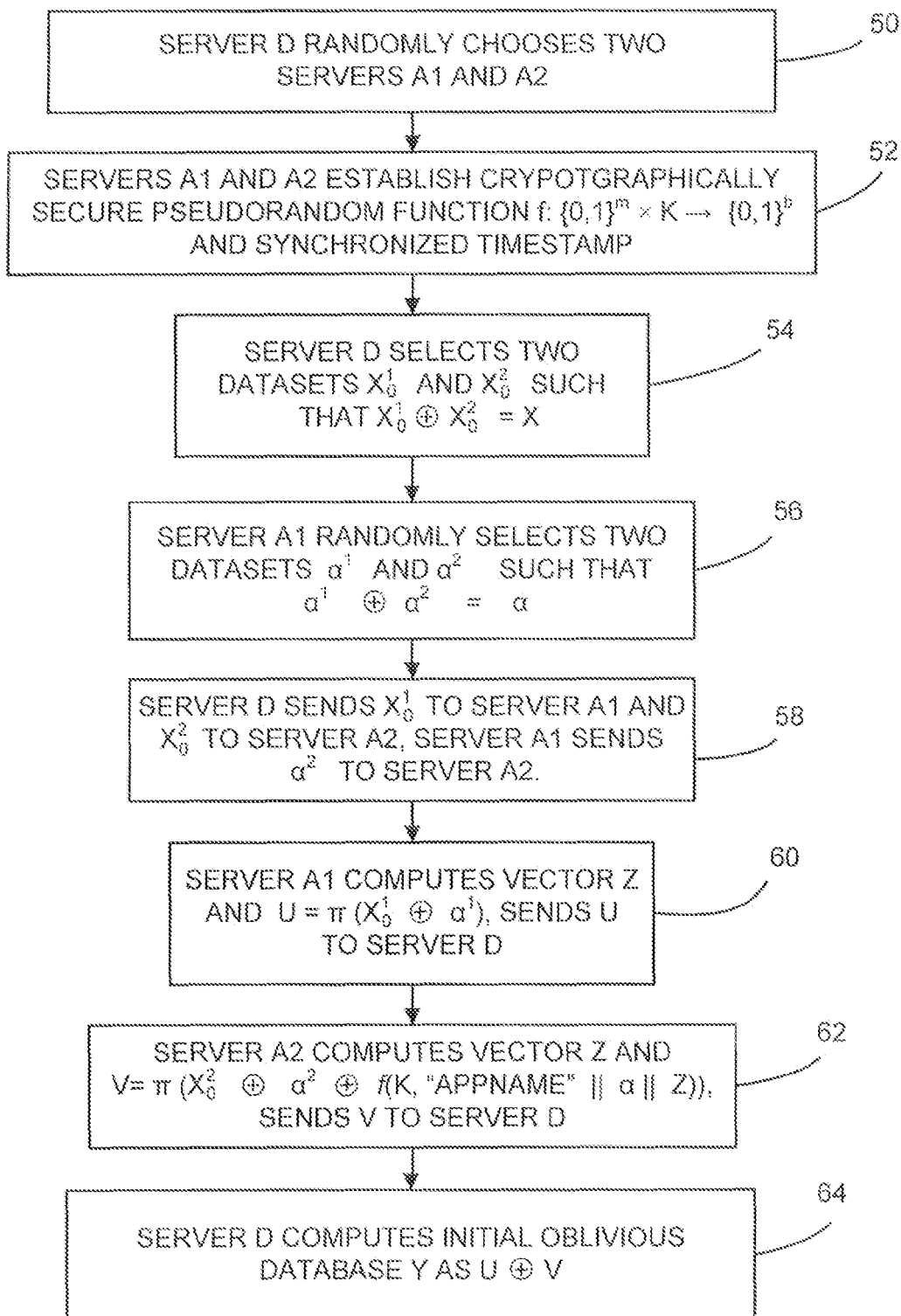
FIG. 2 is a flowchart illustrating a preprocessing setup to enable computation of the oblivious database according to an embodiment of the present invention.

Referring now to FIG. 2, there is illustrated in flow diagram form the preprocessing setup to enable the server 10 to compute the oblivious database y 18 according to an embodiment of the present invention. In step 50, the server D 10 randomly chooses two servers, e.g., servers $A_1$ 20 and $A_2$ 22, out of the l available random servers. In step 52, the servers $A_1$ 20 and $A_2$ 22 establish a cryptographically secure pseudorandom function (PRF) $f:\{0,1\}^m \times K \to \{0,1\}^b$ and a synchronized timestamp, where m, the length of the input, can be chosen arbitrarily, K is a symmetric key and b is the length of a block in bits. In step 54, the server D 10 chooses at random two datasets $x_0^1$ and $x_0^2$, such that $x_0^1 \oplus x_0^2 = x$. Note that $x_0$ denotes the starting database x 12. In step 56, server $A_1$ 20 chooses at random $\alpha^1$ and $\alpha^2$, such that $\alpha^1 \oplus \alpha^2 = \alpha$. The scheme described by Gertner et al. also requires server $A_2$ 22 to choose uniformly at random $\pi_1$ and $\pi_2$, such that $\pi_2(\pi_1(\bullet))= \pi(\bullet)$. The present invention, in contrast, makes no such requirement for a few reasons. First, it does not result in any privacy gain since it is quite trivial for server $A_1$ 20 to compute $\pi_2$ from the expression $\pi_2^{-1}(\pi)=\pi_1$. Server $A_1$ 20 has knowledge of $\pi$ and is required to receive $\pi_1$ server $A_2$ 22. Second, removing the restrictions enables the server 10 to engage more than two random servers in the multi-party protocol. More servers give a better security for the database since the chances of three or more random, servers not colluding is better than for two servers. In step 58, server D 10 sends $x_0^1$ to server $A_1$ 20 and $x_0^2$ to server $A_2$ 22, and server $A_1$ 20 sends $\alpha^2$ to server $A_2$ 22.

In step 60, server $A_1$ 20 creates a vector z of length n and initializes each of its elements to the current timestamp, computes a temporary dataset $u=\pi(x_0^1 \oplus \alpha^1)$, and sends u to server D 10. In step 62, server $A_2$ 22 similarly creates a vector z and initializes each of its elements to the current timestamp. However, it computes a temporary dataset $v=\pi(x_0^2 \oplus \alpha^2 \oplus f(K, \text{"AppName"}\|\alpha\|z))$ and sends v to server D 10. In step 64, server D 10 computes the initial oblivious database 18 y as $u \oplus v = \pi(x \oplus \alpha \oplus f(K, \text{"AppName"}\|\alpha\|z))$. Additionally, servers $A_1$ 20 and $A_2$ 22 respectively discard their snare of $x_0^1$ and $x_0^2$, and reset u and v to $\perp$ (empty value).

Figure 3:
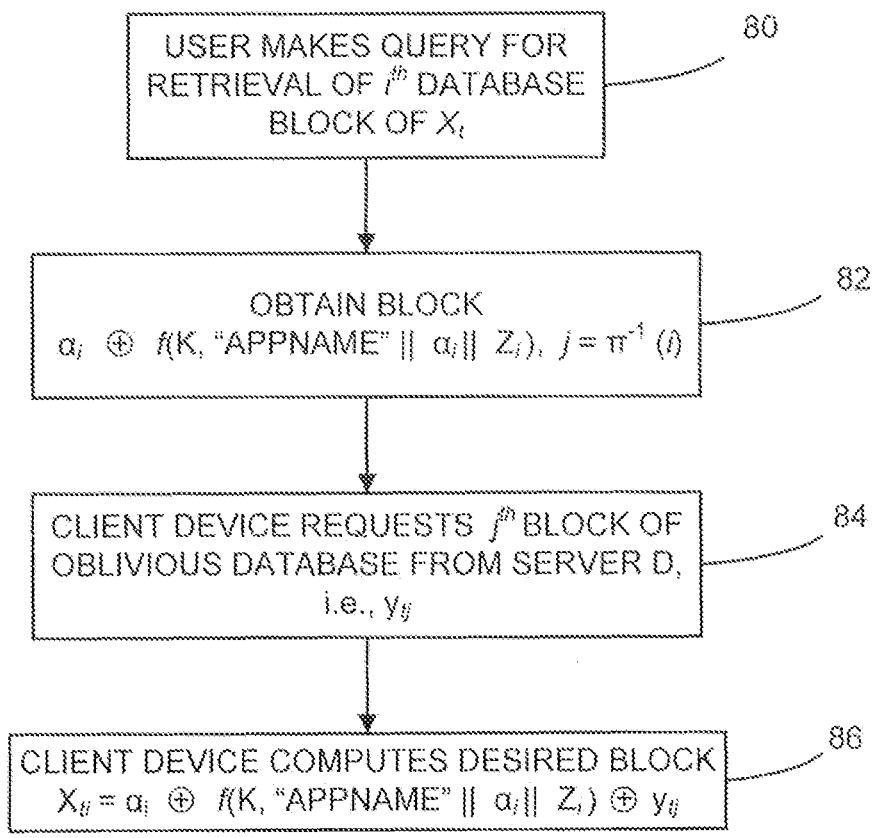
FIG. 3 is a flowchart illustrating the processing of a user query according to an embodiment of the present invention.

Referring now to FIG. 3, there is illustrated in flow diagram form the processing of a user query according to an embodiment of the present invention. In step 80, a user, using the client device 16, runs the underlying PIR scheme with $A_1$ and $A_2$ (or $A_1$, $A_2$ and one or more other random servers sharing the same state as $A_2$). Suppose, for example, that a user query to the database 12 of server 10 requires retrieval of the $i^{th}$ database block of $x_t$ (i.e., $x_{ti}$, where t is the current version of the database and i is the index or address of the block sought). The result will be in step 82 for the client device to obtain from the random servers 20-24 a block $\alpha_i \oplus f(K, \text{"AppName"}\|\alpha_i\|z_i)$, $j=\pi^{-1}(i)$. In step 84, the client device 16 asks the server D 10 for the $j^{th}$ block of the oblivious database, i.e., $y_{tj}$. In step 86, the client device 16 computes the the desired block $x_{ti}=\alpha_i \oplus f(K, \text{"AppName"}\|\alpha_i\|z_i) \oplus y_{tj}$.

Figure 4:
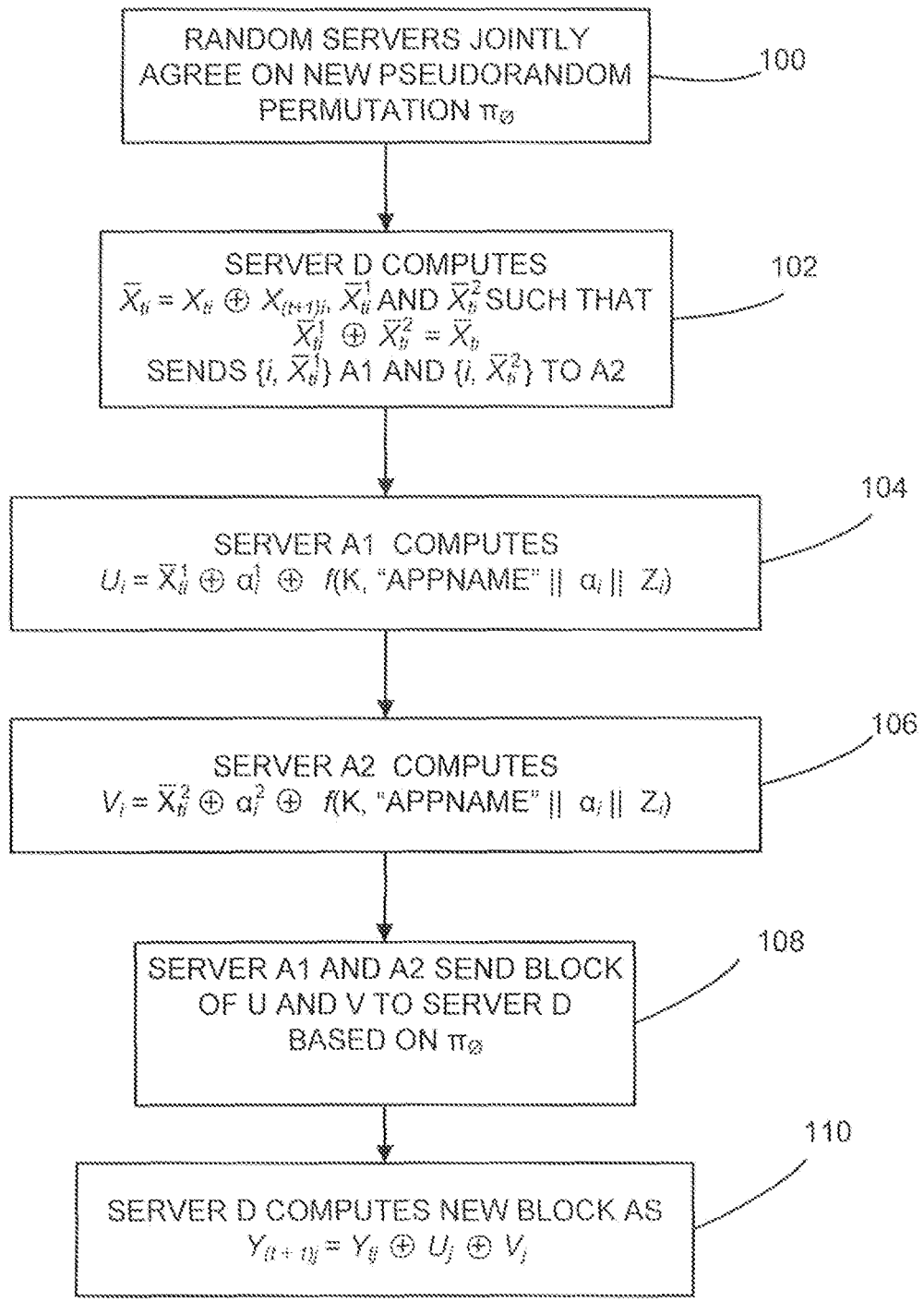
FIG. 4 is a flowchart illustrating the updating of the original database according to an embodiment of the present invention.

Referring now to FIG. 4, there is illustrated in flow diagram form the processing to update the original database that allows the updates to occur concurrently with query processing, and without leaking any information about the correspondence between an updated record in the database and the respective oblivious database blocks according to embodiments of the present invention. Suppose, for example, the owner of the database 12 updates the ith record of database $x_t$ (i.e., $x_{ti}$), making it necessary to update the corresponding oblivious database block $y_{tj}$, which is queried directly by users. However, it is desired to make changes in a way that does not allow server 10 to establish that $j=\pi^{-1}(i)$. If changes to $y_{ti}$ are naively made shortly after $x_{ti}$ is updated, then the server 10 will be able to learn the permutation. The present invention is based on making changes, to the oblivious database $y_t$ in an order that is independent of how the database $x_t$ changes, and in a way that keeps the changes in $y_t$ unpredictable from the known changes in $x_t$. In other words, each incremental change made to $y_t$ does not reveal to the server 10 which of the $x_{ti}$'s it was that triggered the change.

In step 100, prior to receiving the first update from server D 10, the random servers $A_1$ 20 and $A_2$ 22 jointly agree on a new pseudorandom permutation $\pi_0$, which will be used to define the order to send bits of data that will be used to update the oblivious database $y_t$. Note that $\pi_0$ is unrelated to $\pi$ held by the random servers 20, 22. Additionally, they establish a coin toss that allows them to switch roles in the protocol either as a randomizer or a timer. A randomizer deals out a share of $\alpha_i$ to the other random server(s), such that the sum of their shares (mod2) is the same as $\alpha_i$. A timer adds the evaluation of $f(K, \text{"AppName"}\|\alpha_i\|z_c)$ (using the current timestamp $z_c$) to its update piece for $y_{ti}$ (described below). The coin toss might be established from the bits output by a pseudorandom generator sharing a common key and state (e.g., AES on the string of the application name with the same key and initialization vector, where a '0' and '1' could indicate a randomizer or timer). Suppose that the original $i^{th}$ block is $x_{ti}$ and the updated $i^{th}$ block is $x_{(t+1)i}$.

In step 102, server D 10 computes $\bar{x}_{ti} = x_{ti} \oplus x_{(t+1)i}$, $\bar{x}_{ti}^1$, and $\bar{x}_{ti}^2$, such that $\bar{x}_{ti}^1 \oplus \bar{x}_{ti}^2 = \bar{x}_{ti}$. Then it sends $\{i, \bar{x}_{ti}^1\}$ to server $A_1$ 20 and $\{i, \bar{x}_{ti}^2\}$ to server $A_2$ 22. In step 104, on receipt of $\bar{x}_{ti}^1$, server $A_1$ 20 computes $u_i = \bar{x}_{ti}^1 \oplus \alpha_i^1 \oplus f(K, \text{"AppName"}\|\alpha_i\|z_i)$ using the current timestamp $z_c$ for $z_i$ if role is timer, otherwise it uses the saved timestamp value if role is randomizer. In either case, it updates the value of $z_i \leftarrow z_c$ after the computation. It then saves $u_i$ to a dataset u stored in an update cache in server $A_1$ 20. In step 106, on receipt of $\bar{x}_{ti}^2$, server $A_2$ 22 computes $v_i = \bar{x}_{ti}^2 \oplus \alpha_i^2 \oplus f(K, \text{"AppName"}\|\alpha_i\|z_i)$ using the current timestamp $z_c$ for $z_i$ if role is timer or the saved time if role is randomizer. Afterwards, it then updates the timestamp $z_i \leftarrow z_c$ and saves $v_i$ to a dataset v stored in an update cache in server $A_2$ 22. In step 108, both server $A_1$ 20 and server $A_2$ 22 follow the order defined by $\pi_0$ to respectively send a single block of u and v to the database server D 10. Once a block $u_j$ or $v_j$ is sent, each random server 20, 22 resets its slot to $\bot$. In step 110, on receipt of $\{j, u_j\}$ and $\{j, v_j\}$, server D 10 can compute the new block as $y_{(t+1)j} = y_{tj} \oplus u_j \oplus v_j \oplus \hat{x}_{ti} \oplus \alpha_i \oplus f(K, \text{"AppName"}\|\alpha_i\|z_c)$. Note that $f(K, \text{"AppName"}\|\alpha_i\|z_c)$ re-randomizes $y_{(t+1)i}$ irrespective of whether $x_{(t+1)i}$ changes or not. The database owner will be unable to predict if $x_{ti}$ has changed or not. After all the blocks of u and v corresponding to the last index of $\pi_0$ has been processed, the random servers 20, 22 picks a different $\pi_0$, a different $\pi$ and then repeats the above steps to help update the oblivious database $y_t$. Finally, server D 10 can compute a new block of oblivious data $y_{(t+1)j} = \pi_1^2(u_1) \oplus v_1 \oplus y_0$, which would give $\pi_1(x_1 \oplus \alpha_1)$ for the updated block of x and $\pi_1(x_0 \oplus \alpha_1)$ for the unchanged blocks.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a first server to compute an oblivious database based on an original database such that a data block of the original database can be updated without the first server being able to determine the corresponding data block in the oblivious database, the method comprising:

selecting, by the first server, a first random server and a second random server from a plurality of random servers, each of the random servers having a random database;

establishing, by the first random server and the second random server, a cryptographically secure pseudorandom function and a synchronized timestamp;

selecting, by the first server from the original database, a first original database random data set and a second original database random data set;

sending, by the first server, the first original database random data set to the first random server and the second original database random data set to the second random server;

selecting, by the first random server from the random database, a first random database random data set and a second random database random data set;

sending, by the first random server, the second random database random data set to the second random server;

computing, by the first random server, a first vector of length n and initializing each element of the first vector to a current timestamp;

computing, by the first random server, a first temporary data set based on the first original database random data set and the first random database random data set and sending the first temporary data set to the first server;

computing, by the second random server, a second vector of length n and initializing each element of the second vector to the current timestamp;

computing, by the second random server, a second temporary data set based on the second original database random data set, the second random database random data set and the cryptographically secure pseudorandom function, and sending the second temporary data set to the first server; and computing, by the first server, the oblivious database based on the first temporary data set and the second temporary data set.

2. A method for a first server to update a data block of an oblivious database with updated data, the oblivious database being based on an original database, such that the first server cannot determine a correspondence between the original database and the oblivious database, the method comprising:

separating, by the first server, the updated data into a first random block of data and a second random block of data;

sending, by the first server, the first random block of data and an index for the data block being updated to a first random server and the second random block of data and the index to a second random server;

computing, by the first random server, a first temporary value based on the first random block of data, a corresponding block of data from a random database, and a pseudorandom function;

storing, by the first random server, the first temporary value in a first update cache;

computing, by the second random server, a second temporary value based on the second random block of data, a corresponding block of data from the random database, and the pseudorandom function;

storing, by the second random server, the second temporary value in a second update cache;

sending, by the first random server, a single block of the first update cache and an index of the single block from the first update cache to the first server;

sending, by the second random server, a corresponding single block of the second update cache and an index of the corresponding single block of the second update cache to the first server; and computing, by the first server, the updated data block of the oblivious database based on a current value of the data block being updated, the single block of the first update cache and the single block of the second update cache.

\* \* \* \* \*